March 28, 1933.   F. G. PECK   1,903,243
MACHINE FOR MAKING COLLAPSED CARTONS
Filed March 23, 1931   13 Sheets-Sheet 1
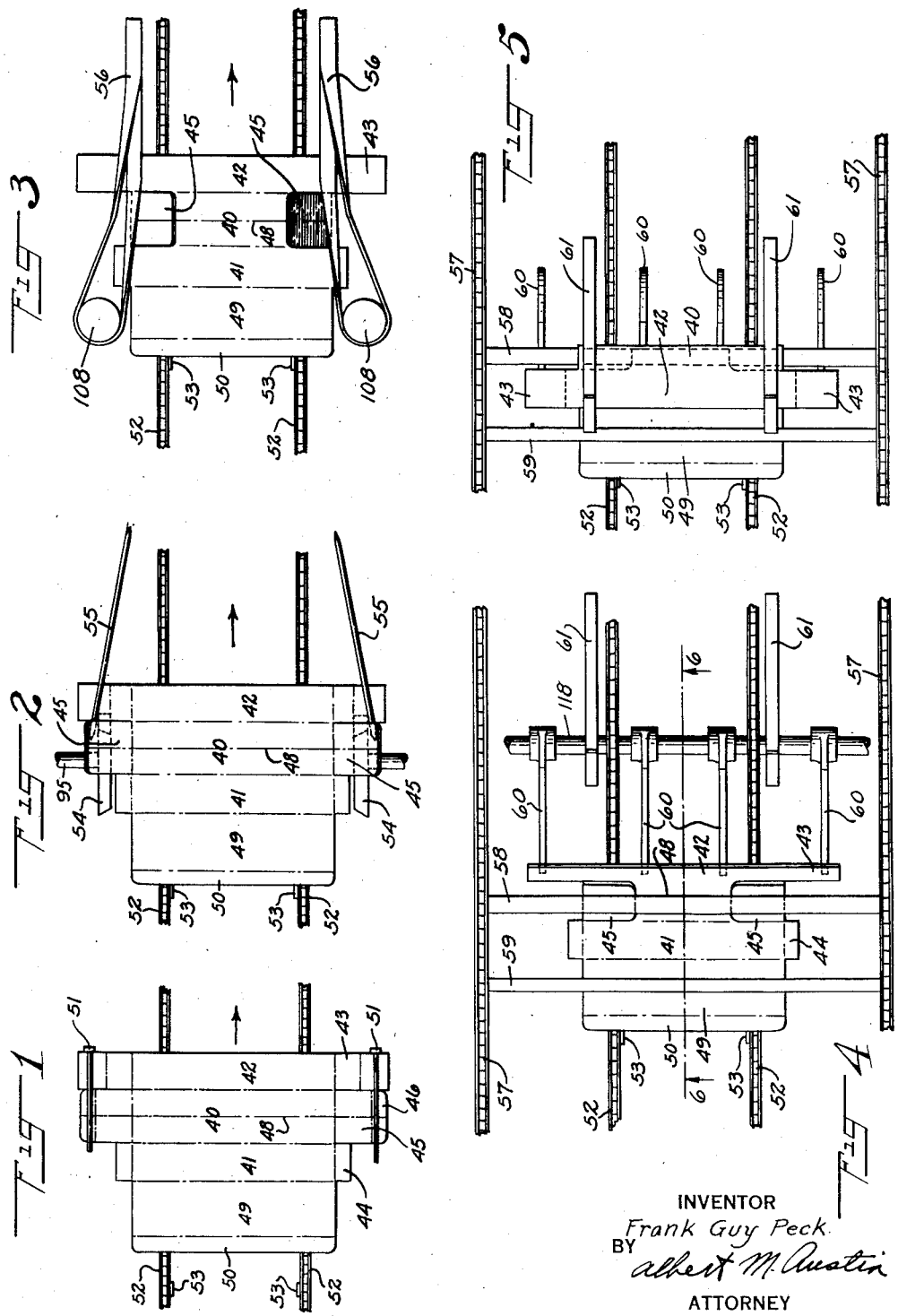
INVENTOR
Frank Guy Peck.
BY
Albert M. Austin
ATTORNEY March 28, 1933.   F. G. PECK   1,903,243
MACHINE FOR MAKING COLLAPSED CARTONS
Filed March 23, 1931   13 Sheets-Sheet 2
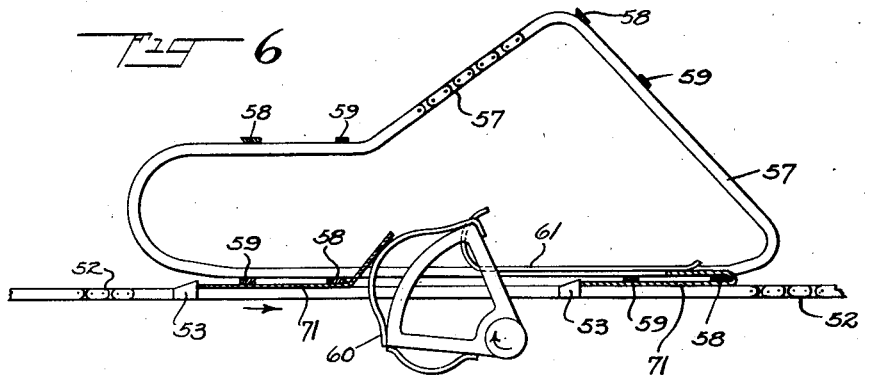
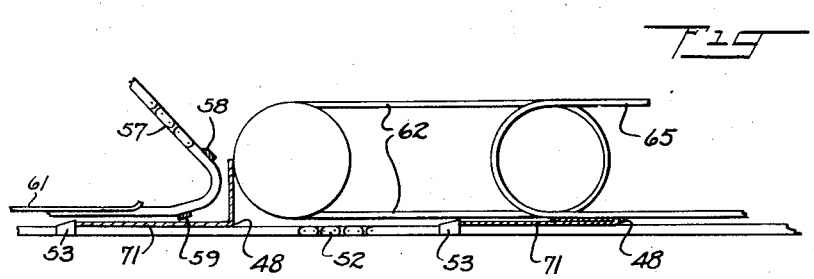
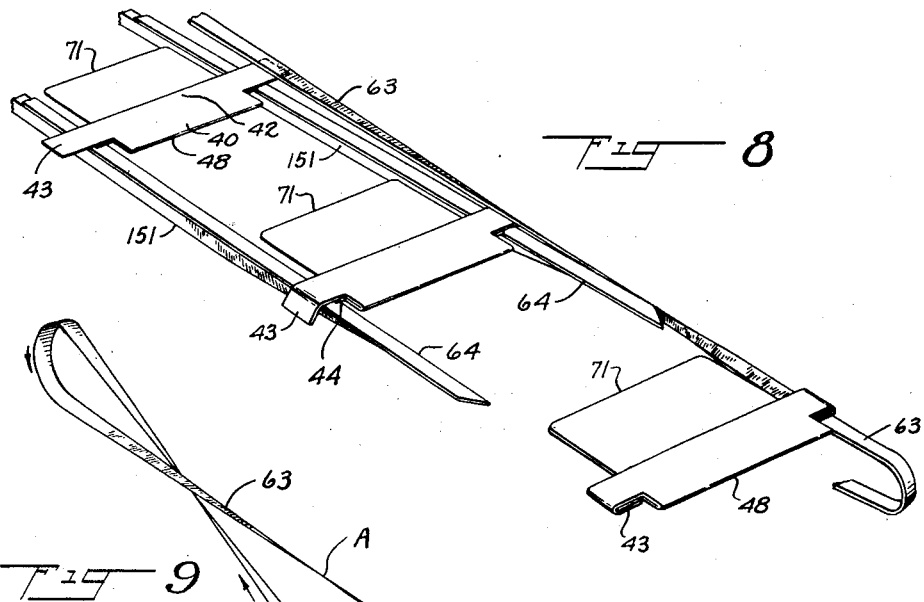
INVENTOR
Frank Guy Peck
BY Albert M. Austin
ATTORNEY

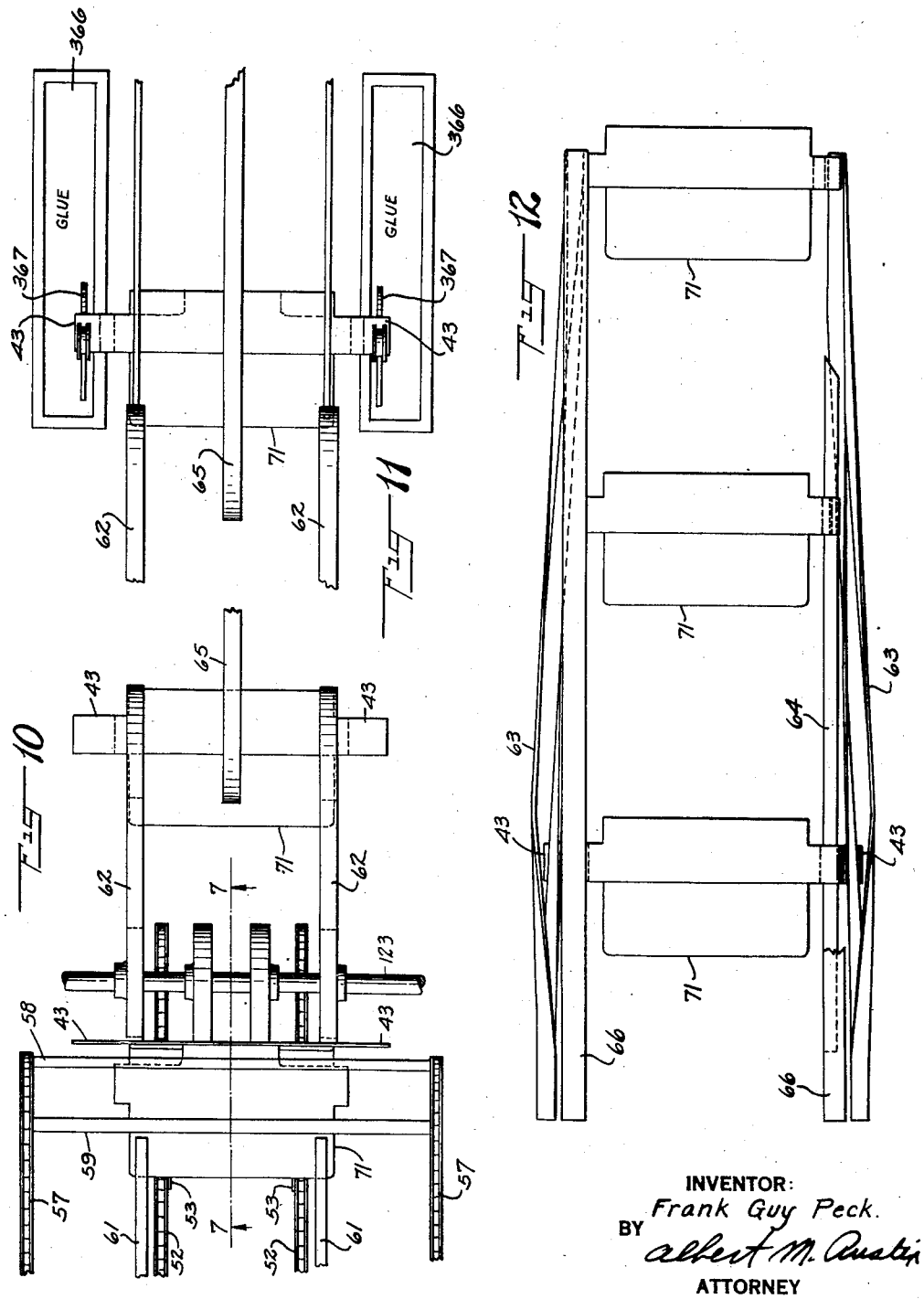

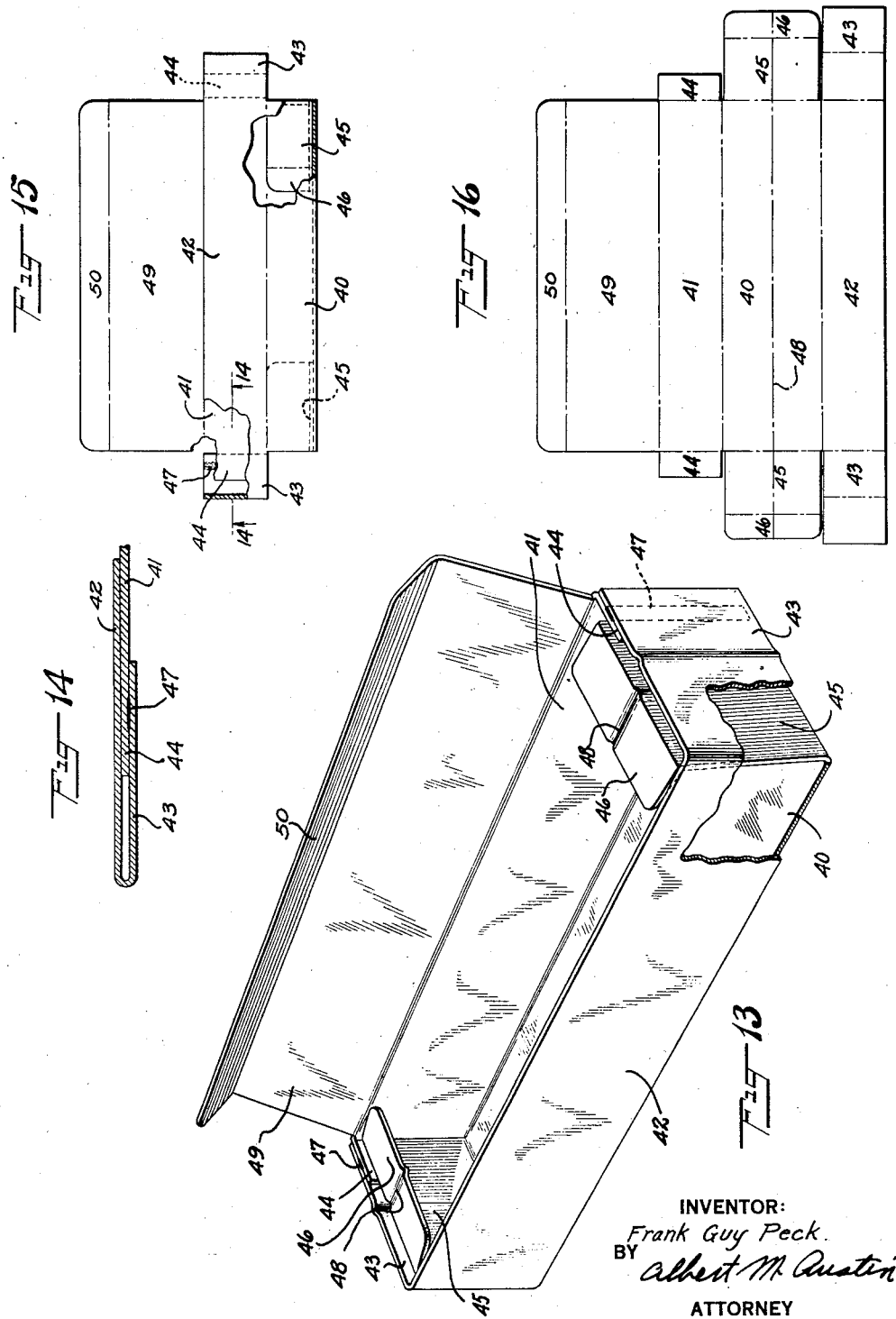

March 28, 1933. F. G. PECK 1,903,243
MACHINE FOR MAKING COLLAPSED CARTONS
Filed March 23, 1931  13 Sheets-Sheet 5
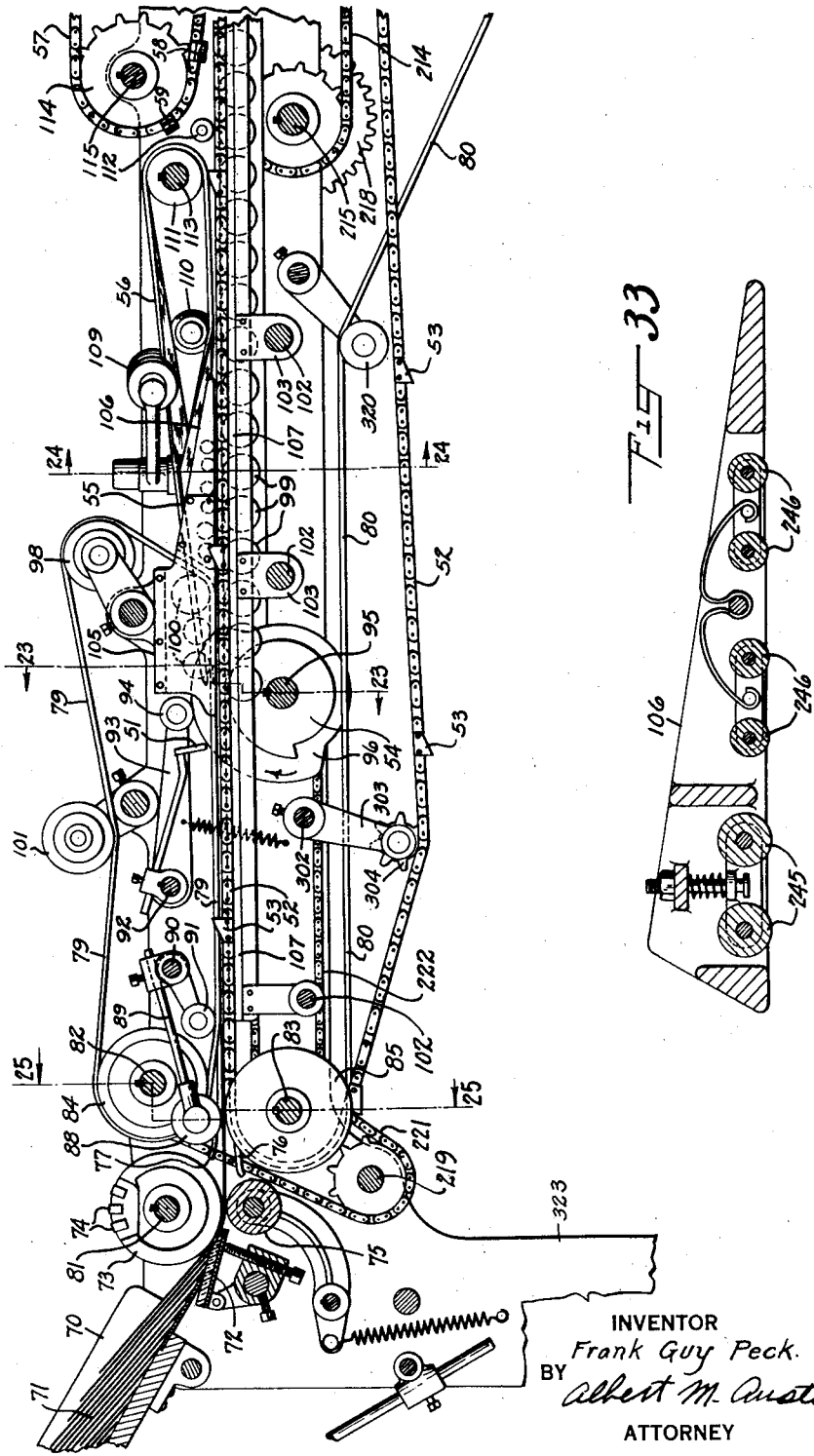

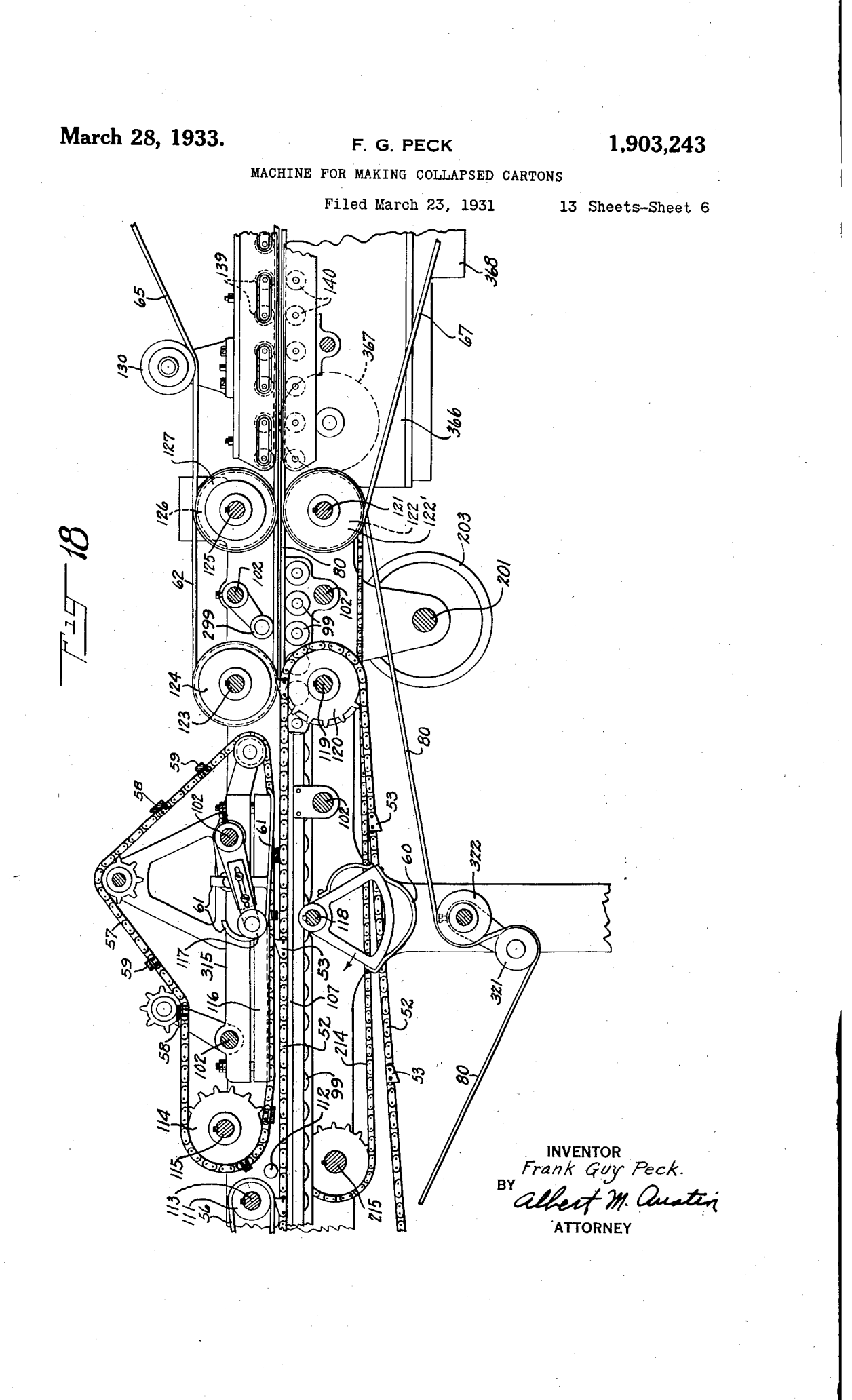

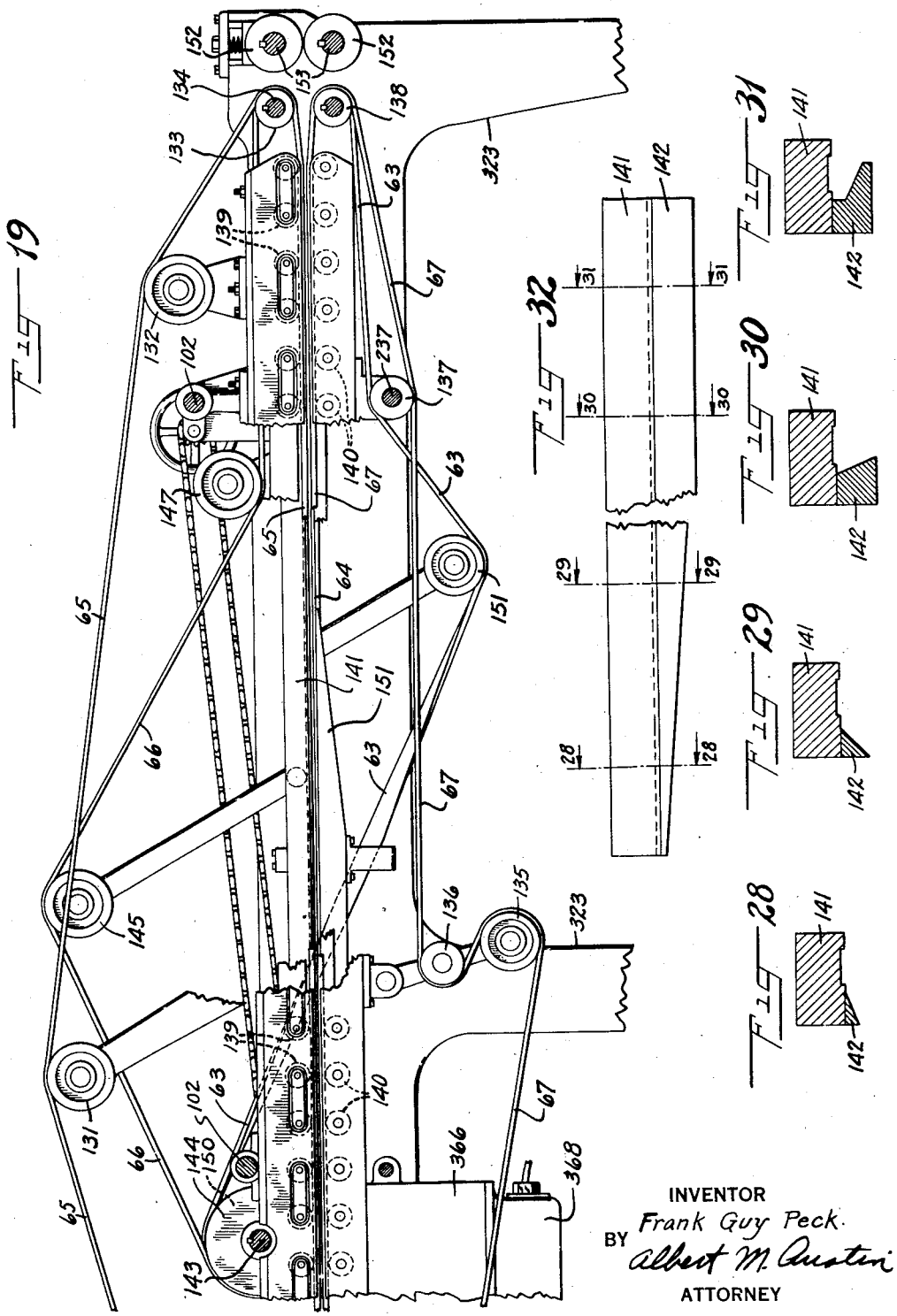

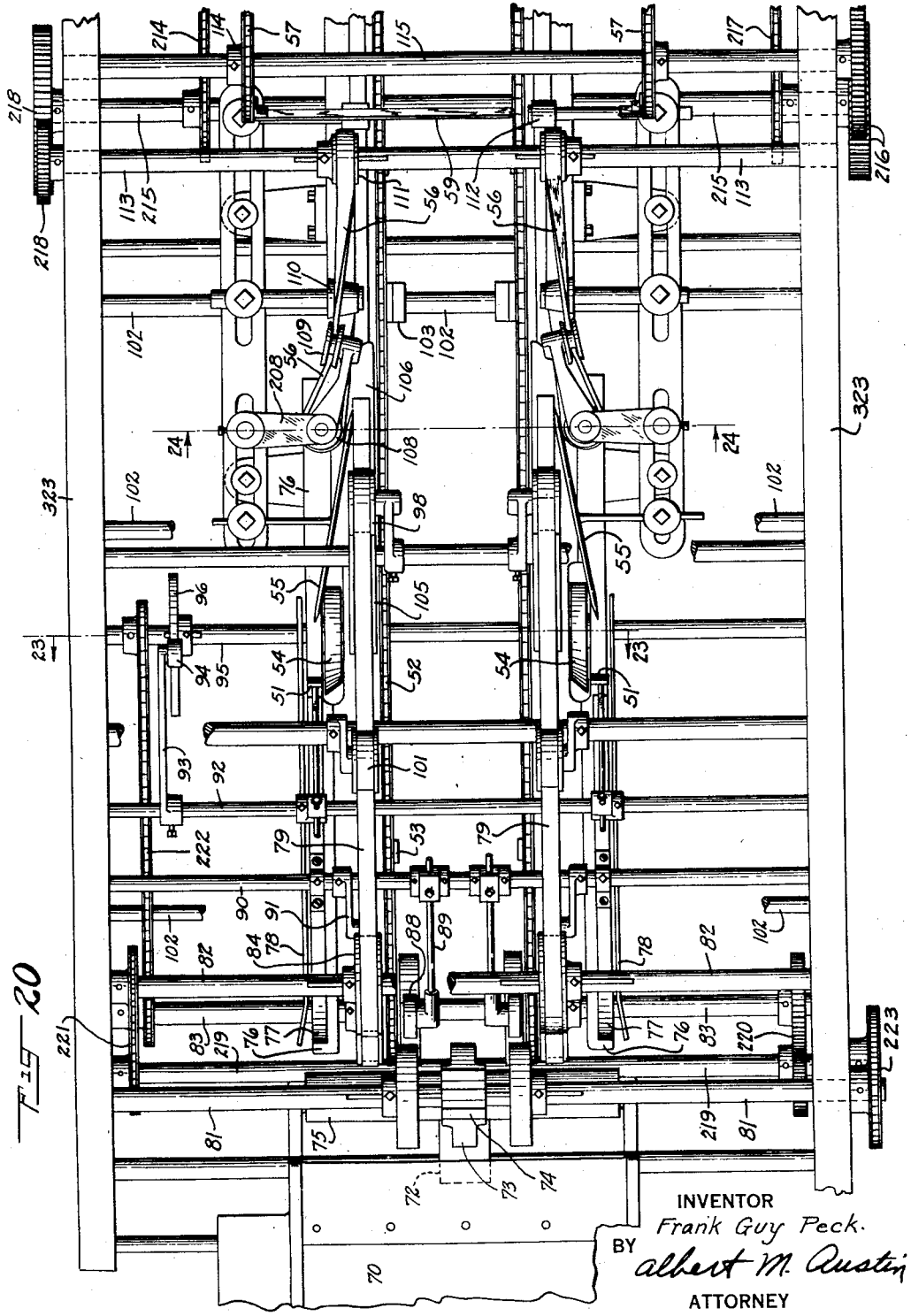

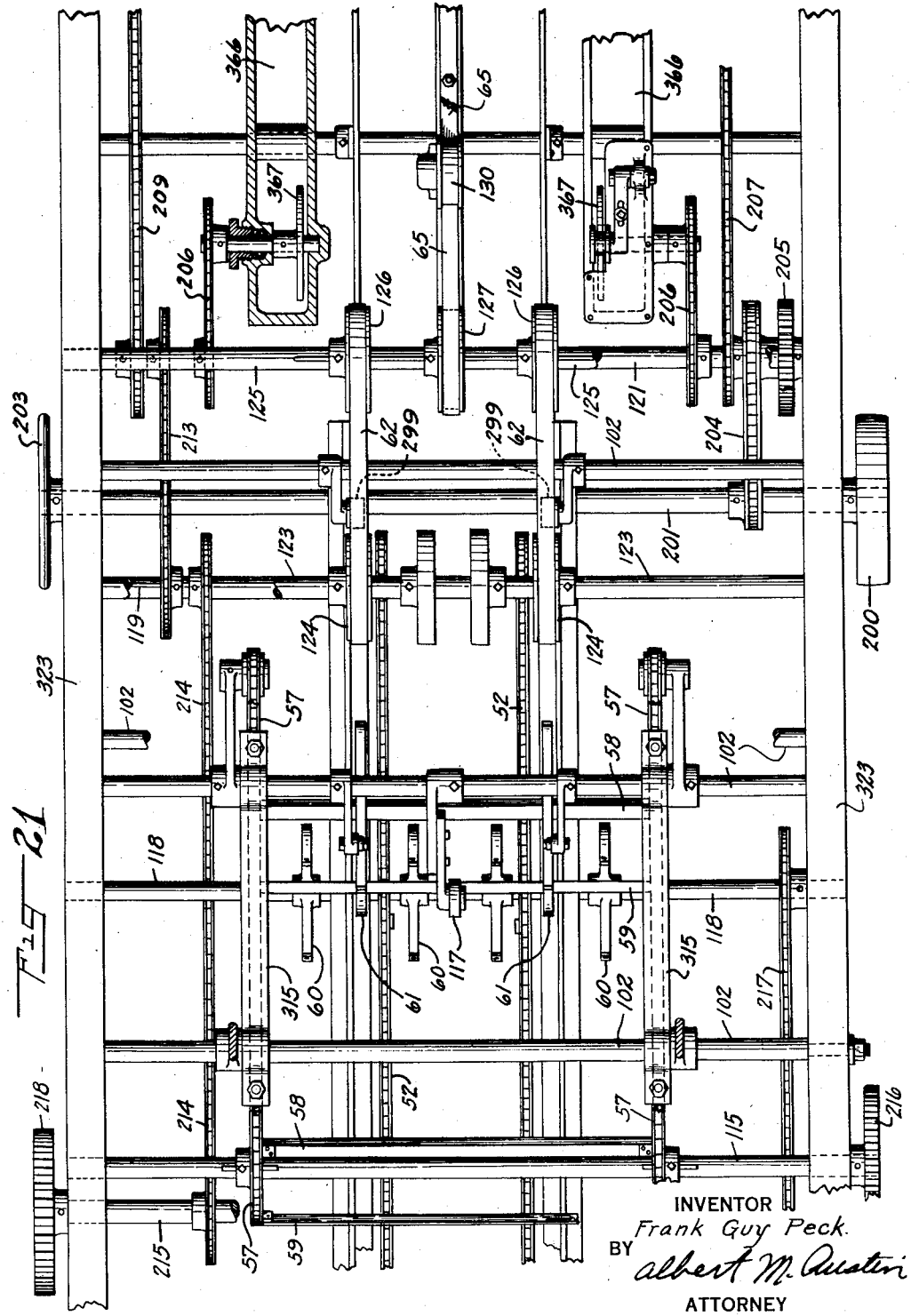

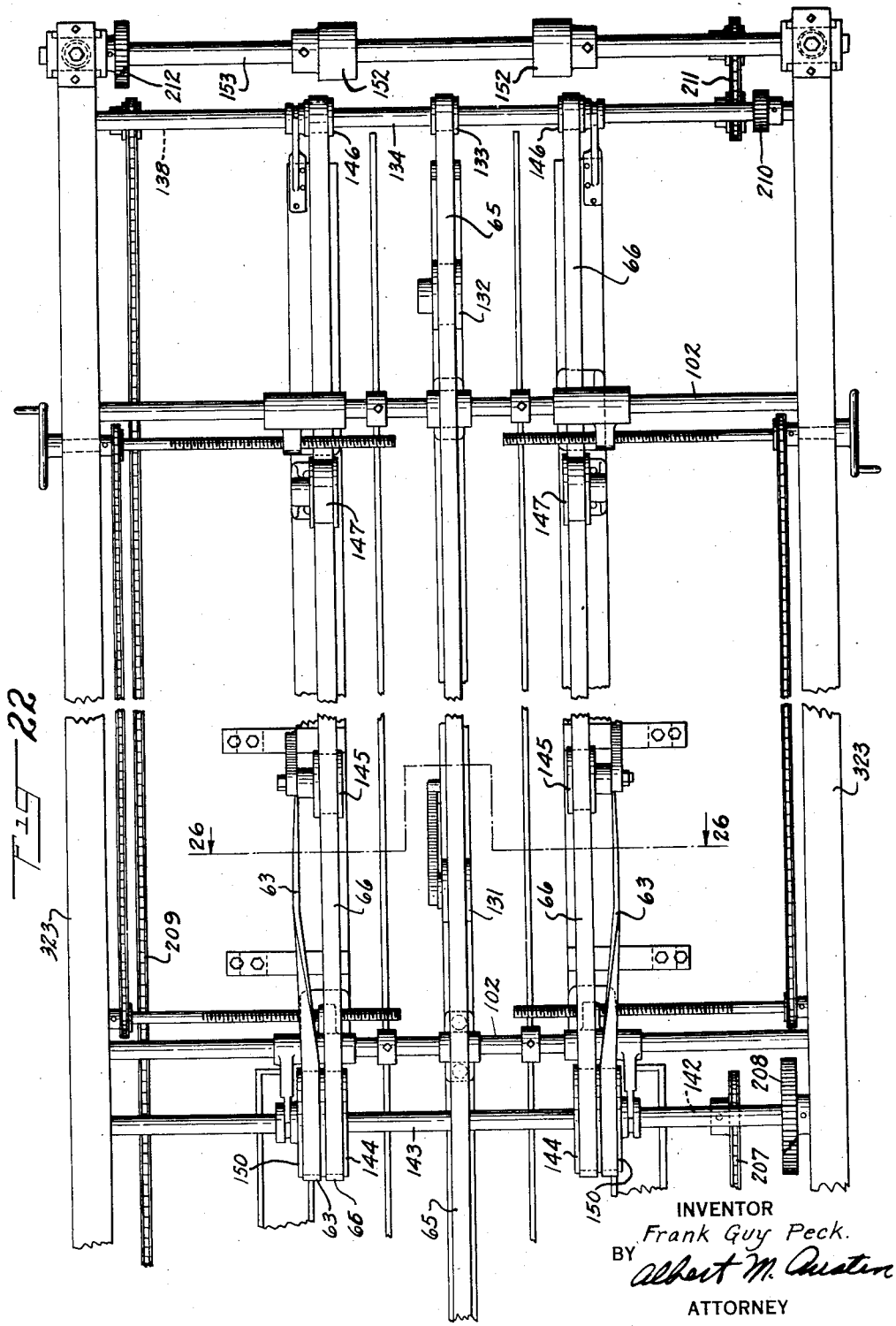

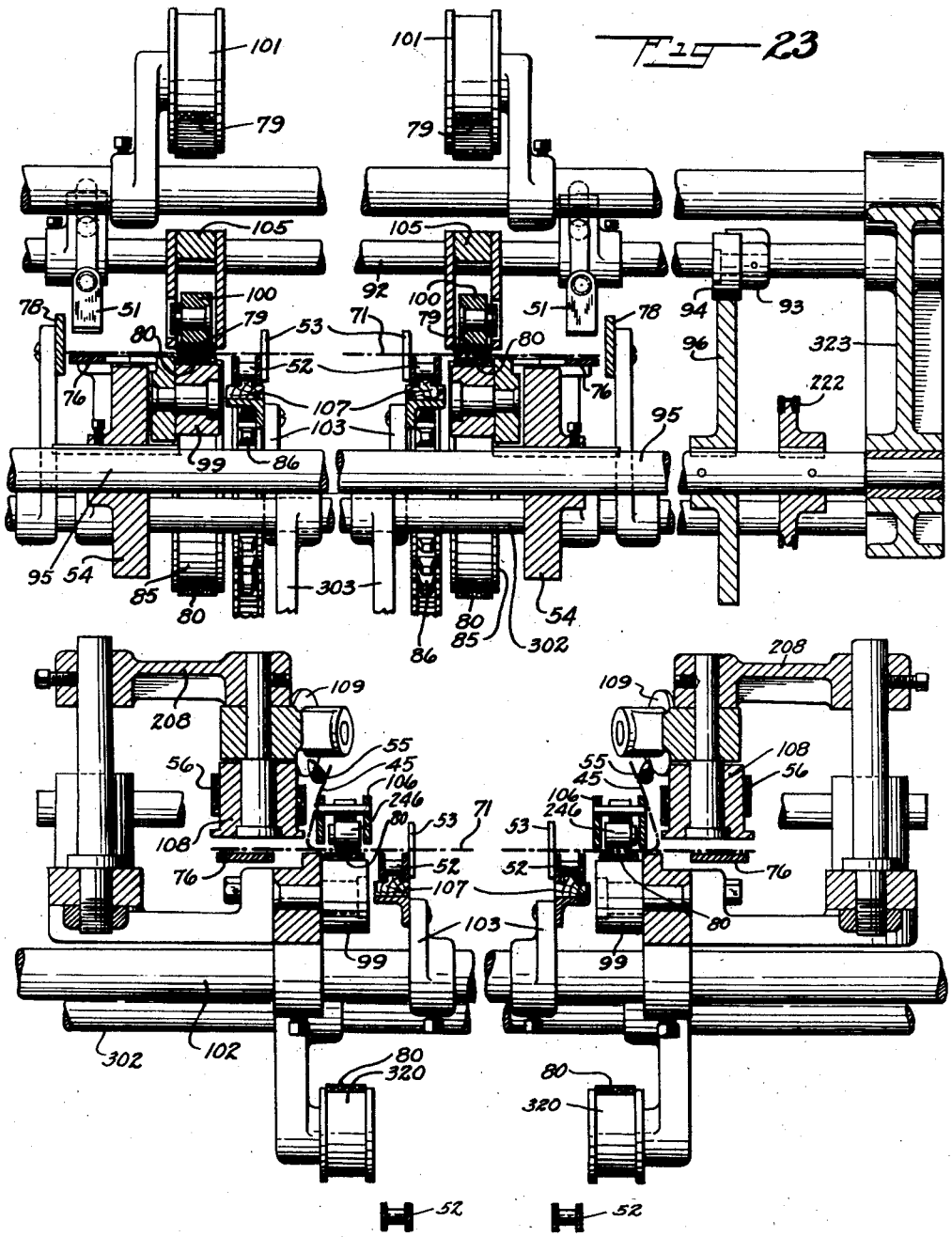

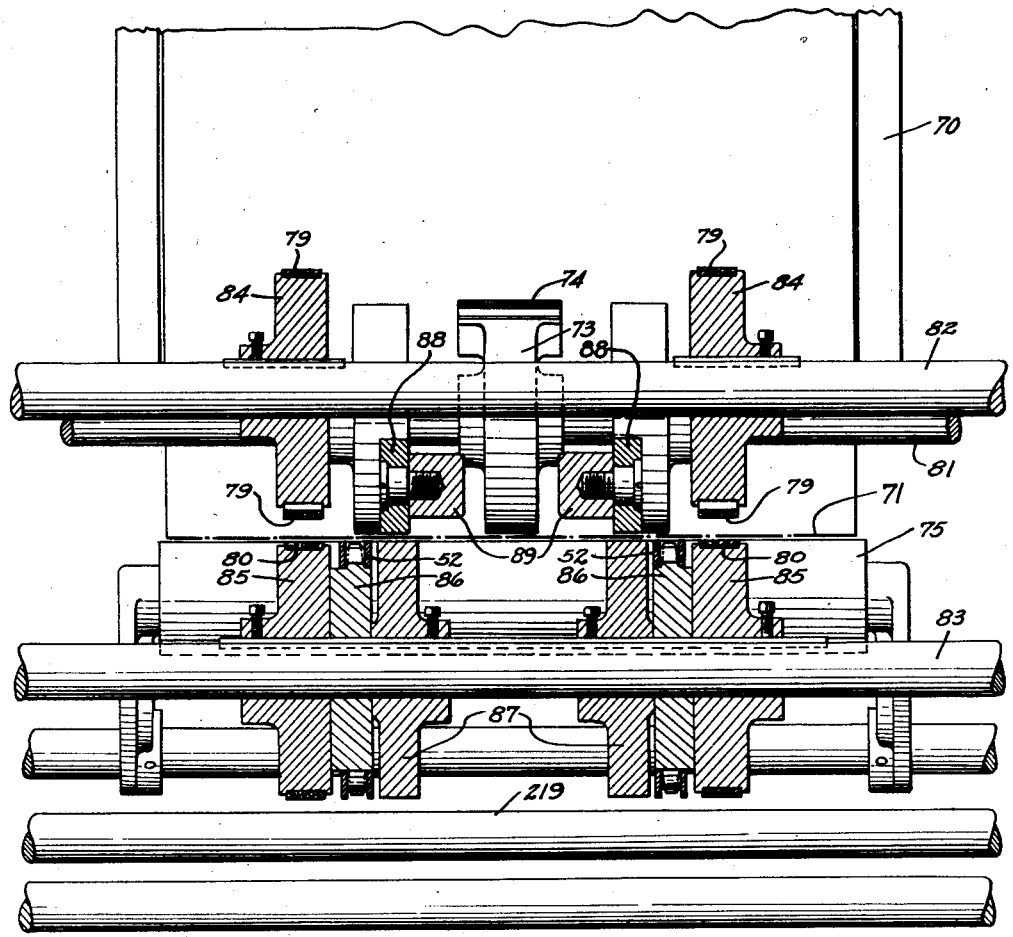

March 28, 1933.    F. G. PECK    1,903,243
MACHINE FOR MAKING COLLAPSED CARTONS
Filed March 23, 1931    13 Sheets-Sheet 13
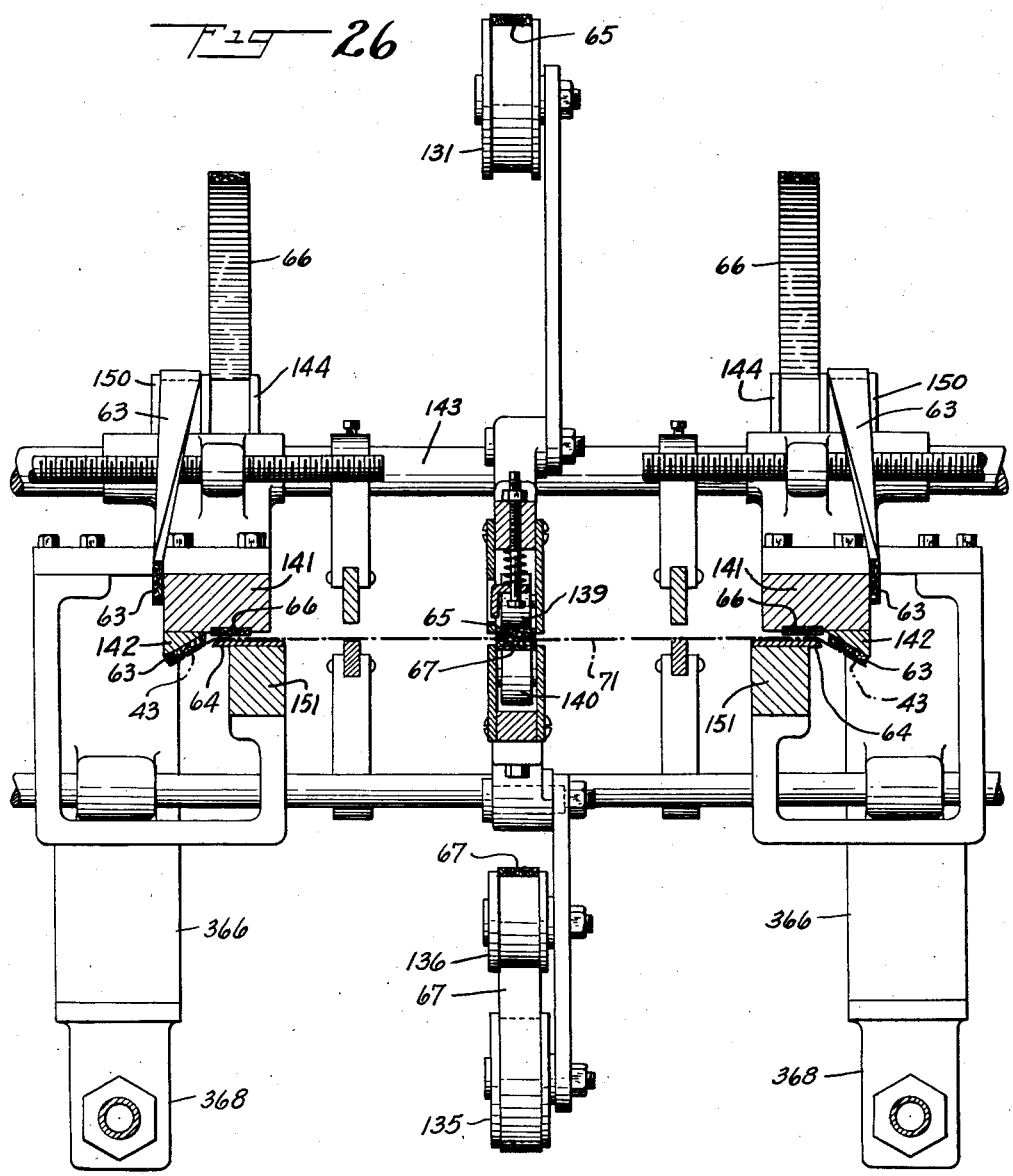
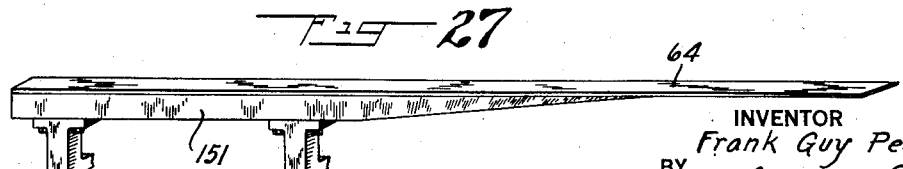
INVENTOR
Frank Guy Peck.
BY Albert M. Austin
ATTORNEY Patented Mar. 28, 1933

1,903,243

UNITED STATES PATENT OFFICE

FRANK GUY PECK, OF NEW HAVEN, CONNECTICUT, ASSIGNOR, BY MESNE ASSIGNMENTS, TO THE GUARDIAN TRUST COMPANY, OF CLEVELAND, OHIO, A CORPORATION OF OHIO, TRUSTEE

MACHINE FOR MAKING COLLAPSED CARTONS

Application filed March 23, 1931. Serial No. 524,427.

The invention relates in general to machines for making paper boxes, and more particularly to machines for making collapsible paper boxes.

According to a preferred embodiment of the invention, a machine is provided to which a stack of pre-scored blanks may be fed. The machine folds in selected marginal portions of the blank and then folds the entire blank about a transverse central score through the bottom. After this, the machine glues other selected marginal portions of the blank and delivers a completed glued box in collapsed form.

Various mechanical devices are provided for performing the several functions of the machine and for registering the blanks both transversely and longitudinally. The blanks are fed through the machine in a straight line and all of the operations are performed while the blank is travelling in a straight line. The machine may be adjusted to take care of blanks of different size and shape to meet the exigencies of different kinds of boxes demanded by the trade.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Figs. 1 to 12, inclusive, illustrate diagrammatically certain parts of the machine and the operation thereof upon the blank as it travels through the machine;

Figs. 13 to 16, inclusive, illustrate a type of box which may be made by the machine according to the invention;

Figs. 17, 18 and 19 are vertical sections taken through the machine illustrating the construction thereof;

Figs. 20, 21 and 22 are plan views corresponding to Figs. 17, 18 and 19;

Figs. 23, 24, 25 and 26 are sections taken on the lines 23—23, 24—24, 25—25 and 26—26, respectively, of Figs. 17 to 22, inclusive;

Fig. 27 illustrates the lower turning bar for folding flaps after the gluing operation;

Figs. 28 to 31, inclusive, are sections taken on the lines 28—28, 29—29, 30—30, 31—31 of Fig. 32;

Fig. 32 represents the upper turning bar; and

Fig. 33 represents presser rollers used in the machine.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring first to Figs. 13 to 16, inclusive, one form of box which will be made by the machine will be described for purposes of illustrating the invention. The blank is represented in Fig. 16, the dot-and-dash lines representing scores.

The blank comprises a bottom wall 40, front wall 42, back wall 41, top cover 49, cover tongue 50, side wall liners 45, liner tongues 46, and side wall flaps 43 and 44. A score line 48 is provided through the bottom 40, liners 45 and tongues 46 to collapse the blank through the bottom as hereinafter described. The blank, when assembled and set up for use, produces the box illustrated in Fig. 13, a strip of glue 47 connecting the side wall flaps 43 and 44, as indicated.

Referring now to Figs. 1 to 12, inclusive, which illustrate diagrammatically the operations of the machine, a pair of chains 52 are provided, having spaced pins 53. The blank is fed to the chains in a manner hereinafter described and at the proper times a pair of stops 51 stop lengthwise movement of the blank until a pair of pins 53 can engage the rear edge of the blank, at which time the stops 51 are lifted. This registers the blank longitudinally.

In Fig. 2 the pins 53 have carried the blank over cam wheels 54 which are so positioned and shaped as to raise liners 45 out of the plane of travel and above the turning rods 55. As the blank is carried along in the direction of the arrow, the stationary rods 55 further raise the liners 45 until they are substantially vertical when the liners are engaged by the turning belts 56, as indicated in Fig. 3. These turning belts turn down the liners 45 and hold them down until the blank is fed under a folding mechanism, indicated in Fig. 4.

In Fig. 4 a pair of chains 57 are provided, carrying pairs of cross bars 58 and 59. These chains are so timed that the cross bar 58 always engages the blank at the bottom score 48.

Next, a plurality of cam wheels 60 engage the forward part of the blank and raise it out of the plane of travel, as indicated in Fig. 4, the bars 58 and 59 holding the rest of the blank down. Attention is also called to Fig. 6 which illustrates this operation.

As the blank proceeds it engages the stationary guides 61, which fold over the forward part of the blank onto the rear part of the blank with the cross strip 58 therebetween. The blank is further carried along under the chains 57 to a pair of belts 62 (Fig. 7).

There is a space between chains 57 and belts 62 (Fig. 7) which allows the forward part of the blank to flip up to allow the cross bars 58 and 59 to become disengaged. The belts 62 then carry the blank folded along its bottom score 48 and under the belts 62, as indicated in Fig. 7.

The belts 62 then deliver the folded blank to the gluing mechanism (Fig. 11). The blank is held down by a belt 65 while glue from the glue pots 366, by means of applying wheels 367, is applied to the under surfaces of side flaps 43.

The blanks are then carried over the turning bars 64 (Fig. 12) where they are engaged by inner belts 66 and outer belts 63 which turn down the side flaps 43 and fold them up against the side flaps 44 and hold these flaps together until the glue is sufficiently dry. The blank is then delivered from the machine.

Referring now to Figs. 17 to 22, inclusive, for a description of the structure of the machine, Figs. 17, 18 and 19 and corresponding Figs. 20, 21 and 22 may be placed end to end in order to illustrate the entire machine. The machine comprises a suitable framework made up of longitudinal side members 323 connected by suitable cross members or bars 102.

A stack of blanks, as illustrated in Fig. 16, is indicated by 71 and is disposed in the feed box 70. These blanks engage an apron 72 and a feed wheel 73 having a plurality of rubber inserts 74 and mounted on shaft 81 which feeds the blanks one by one to the lower and upper guides 76 and 77. A spring pressed roller 75 assists in feeding the blanks to guides 76 and 77. Side guides 78 are also provided for registering the blanks laterally.

Two upper feed belts 79 are provided (Fig. 25) running on rollers 84 mounted on shaft 82. Lower feed belts 80 are also provided running on rollers 85 which are mounted on shaft 83. It will be understood that the blanks are fed between these pairs of upper and lower belts. Lower belts 80 are also supported by pulleys 320, 321, and pulleys (not shown) on shaft 121.

The shaft 83 also carries sprockets 86 which carry the chains 52 which have the pins 53. The shaft 83 also carries a pair of rollers 87 which cooperate with presser rollers 88 which are journalled on the ends of arms 89, which in turn are pivoted to stationary shaft 90. A pair of presser rollers 91 are also journalled to arms pivoted to shaft 90 for holding the upper belts 79 in engagement with the blanks.

The stops 51 which assist in registering the blanks longitudinally are carried by arms which are connected to shaft 92. An arm 93 is also connected to shaft 92 and carries a cam follower 94 which engages a cam 96 mounted on shaft 95. Rotation of cam 96 on shaft 95 (Fig. 23) raises the stops 51 and lowers them at proper times.

A plurality of rollers 99, one set on each side, are provided which are mounted upon suitable longitudinal members which are connected to transverse rods 102 which are secured at their ends to the side frames of the machine. Cooperating with some of the rollers 99 and holding the upper belts 79 and lower belts 80 thereagainst are sets of upper rollers 100 which are suitably journalled in frame members 105, which are suitably secured to the main frame of the machine.

A pair of tension rollers 101 are provided for tensioning the belts 79 and a pair of rollers 98 are provided to support the forward end of these belts. The chains 52 are suitably guided on guides 107 which are supported by brackets 103 on transverse rods 102. Chains 52 are further guided by sprockets 304 journalled on arms 303 which are supported by cross rod 302.

At the forward end of the frame pieces 105 are tapered brackets, indicated by 106, carrying a plurality of spring pressed rollers 245 and 246, there being one bracket 106 for each side. These brackets taper to engage under the turning belts 56, as hereinafter described more in detail. Attention is called to Fig. 33 for details of the brackets 106.

Referring now to Fig. 24, the turning belts 56 are supported upon vertically pivoted rollers 108 which are carried on arms 208 which are suitably secured to the frame of the machine. Additional rollers 109 and 110 are provided for guiding the belt 56 in the proper way to make the fold, as illustrated in Fig. 3. The forward ends of the belts 56 are carried on rollers 111, which are mounted on a shaft 113.

It will be understood that the shaft 95 which carries the cam 96 also carries the cam members 54 which raise the liner members 45, as explained above. Also, the turning rods 55 are carried by suitable lateral projections by the frame of the machine, as indicated particularly in Fig. 20.

Referring now to Figs. 18 and 21, the folding chains 57 ride on suitable pairs of sprockets supported by a suitable framework 315 above the chains 52. One pair of sprockets identified by 114 is mounted on shaft 115. Between the turning belts 56 and folding chains 57 are idler rollers 112 to insure the proper feed of the blanks.

Connecting folding chains 57 are pairs of cross bars 58 and 59 which are timed to engage the several blanks with the forward bar 58 opposite the bottom score 48, as described above. The frame 315 carries a pair of loosely mounted members 116 which assist in pressing the folding chains 57 down against the blanks as they travel thereunder.

The folding members 60 are mounted on shaft 118, these members rotating in the direction indicated by the arrow, to fold up the forward part of the blank, as above described. The folded blank is then fed in under the stationary guides 61. Presser roller 117 is disposed at the middle of the blank to assist in holding the blank down at this point.

On shaft 119 are a pair of sprockets 120 which support the forward end of main chains 52. Located above shaft 119 is shaft 123 which carries a pair of rollers 124 which carry belts 62. Another pair of shafts is provided, 121 and 125, carrying rollers 122 and 126. Rollers 126 carry belts 62 and rollers 122 carry lower belts 80. A plurality of rollers 99 are provided on each side, which cooperate with the presser roller 299 to hold the belts 62 and 80 in engagement with the blanks as they pass therebetween.

The blank now approaches the gluing mechanism. Shaft 125 carries a pulley 127 which carries a center belt 65. Referring now also to Fig. 26, in addition to the upper center belt 65, there is a lower center belt 67. The upper center belt 65 is reinforced by spring pressed rollers 139 mounted in a suitable central frame, while lower belt 67 is supported by a plurality of rollers 140.

Upper center belt 65 is supported by rollers 130, 131, 132 and 133 (Fig. 22), roller 133 being supported on shaft 134.

Lower center belt 67 is supported by rollers 135, 136, 137, and upon a suitable roller mounted on shaft 138, in addition to roller 122' on shaft 121.

In addition to the center belts, the gluing mechanism has a pair of inner belts 66 and a pair of outer belts 63. Belts 66 are supported upon rollers 144, which are mounted on shaft 143, upon rollers 145, 147, and upon rollers 146, which are mounted on shaft 134.

Outer belts 63 are supported on rollers 150 mounted on shaft 143, rollers 151, and upon rollers mounted on shafts 237 and 138. It will be noted that the outer belts 63 extend from above the plane of blank movement to a point below the plane of blank movement. See also Fig. 9.

Reinforcing the inner belts 66 are heavy bars 141 having slight recesses therein to guide the belts. Secured to bars 141 are strips 142 whose cross section varies, as indicated in Figs. 28 to 31, to turn the side wall flap of the box under the turning bar 64, which is supported by a heavy member 151.

Referring again to Figs. 8 and 9, it will be seen that the part marked A is the working part of the outer belts and that it starts above the plane of blank movement and ends under it, turning the side wall flaps 43 down and under the turning bar, as indicated in Figs. 8 and 12.

A pair of shafts 153 having rollers 152 thereon are also journalled in the machine for the purpose of discharging the blanks to a suitable delivery mechanism (not shown).

Supported by suitable cross bars are glue pots 366 heated by electric heaters 368 and in which turn the glue applying wheels 367 which apply glue to the flaps 43 as they pass thereover, as indicated in Figs. 11, 18 and 21.

The mechanism for driving the various shafts, pulleys, belts, chains, etc., will now be described. The main drive is through shaft 201 (Figs. 18 and 21) on which is a belt pulley 200 which is driven through a belt by a suitable electric motor (not shown). Shaft 201 also has a hand wheel 203 for adjusting the machine by hand, if desired.

Shaft 201 drives shaft 121 by chain 204. Lower shaft 121 drives upper shaft 125 through gearing 205. Lower shaft 121 drives the glue wheels 367 through chains 206.

Lower shaft 121 drives lower shaft 142 by chain 207. Lower shaft 142 drives upper shaft 143 through gears 208. Lower shaft 121 drives lower shaft 138 by long chain 209. Lower shaft 138 and upper shaft 134 are geared together by gears 210. Chain 211 connects lower shaft 138 and lower shaft 153, shafts 153 being geared together by gears 212.

Going now toward the feeding end of the machine, chain 213 connects lower shaft 121 and lower shaft 119. Chain 214 connects lower shaft 119 and shaft 215. Gears 216 connect shafts 115 and 215. Chain 217 drives shaft 118 from shaft 215, while gears 218 drive shaft 113 from shaft 215.

The main feed chains 52 drive shaft 83 from shaft 119. Gears 220 connect shafts 83 and 219. Chain 221 connects shafts 219 and 82, while chain 222 connects shafts 83 and 95. Chain 223 connects shafts 81 and 219.

It will be understood that all necessary parts such as pulleys, belts, etc., are adjustable across the machine on their various shafts and cross bars to accommodate the machine for different widths and shapes of blanks.

From the above, it is thought the operation of the machine will be clear to those skilled in the art. The machine registers the blanks longitudinally by means of the stops 51 which hold the blanks until they are positively engaged by the pins 53 which then carry the blank to the gluing mechanism. The blanks are registered in width by the side guides 78 which of course may be adjusted for different widths of blanks.

Thus, a machine has been provided which will produce a glued box in collapsed condition, a number of which may be stacked in such condition for economical shipment. All the operations are performed with the blanks travelling in a straight line and at a continuous rate through the machine.

While certain novel features of the invention have been disclosed and are pointed out in the annexed claims, it will be understood that various omissions, substitutions and changes may be made by those skilled in the art without departing from the spirit of the invention.

What is claimed is:

1. In a paper products machine, means to feed a blank through the machine, a pair of side cams for initially deflecting selected side portions of the blank out of the line of travel of the blank, stationary inclined guide rods for further deflecting said side portions as the feeding progresses, a pair of folding belts, one on each side moving with said feeding means to turn said side portions against the body of the blank.

2. In a paper products machine, a carrier band adapted to carry a blank, a pair of side cams for initially raising selected side portions of the blank above said band, stationary inclined guide members for further raising said side portions as the carrier band progresses, and a pair of folding belts, one on each side, moving with said carrier band to turn over said side portions onto the body of the blank.

3. In a paper products machine, means to feed a blank through the machine, a blank-folding device having a folding element adapted to register with a part of the blank, means for deflecting out of the line of travel a first part of said blank, means to fold said first part of said blank over said folding element onto another part of the blank, holding means to hold said blank in folded condition as it is fed through the machine, and means to allow removal of said folding element before said blank is engaged by said holding means.

4. In a paper products machine, a carrier band adapted to carry a blank, a blank-folding band above said carrier band and having cross strips, one of which is adapted to register with a predetermined part of the blank, a cam wheel for raising out of the line of travel the forward part of said blank, a guide above said carrier band to fold down the forward part of said blank over said cross strip onto the rear part of the blank as the carrier band progresses, a second guide above said carrier band, there being a space between said guides to allow said forward part of the blank to spring up to permit removal of said cross strip, said second guide re-folding said forward part over onto said rear part as the carrier band progresses.

5. In a paper products machine, a carrier band adapted to carry a blank, a pair of side cams for initially raising selected side portions of the blank above said band, stationary inclined guide rods for further raising said side portions as the carrier band progresses, a pair of folding belts, one on each side moving with said cam band to turn over said side portions onto the body of the blank, a blank-folding band above said carrier band and having cross strips, one of which is adapted to register with a predetermined part of the blank, a cam wheel for raising out of the line of travel the forward part of said blank, guides above said carrier band to fold down the forward part of said blank over said cross strip onto the rear part of the blank, a second guide above said carrier band, there being a space between said guides to allow said forward part of the blank to spring up to permit removal of said cross strip, said second guide re-folding said forward part over onto said rear part, and means for securing together certain side portions of the blank.

6. In a collapsed box making machine, means to feed a blank through the machine along a substantially straight line in the direction of the length of the blank, means to fold over selected side portions, one on each side of the blank, about longitudinal lines lying in the direction of blank travel onto the body of the blank while the blank is traveling along said straight path, means to fold the forward part of said blank including the front wall of the box over upon the rear part of said blank including the rear wall of the box about a transverse line transverse to the direction of blank travel while the blank is traveling along said straight path, said transverse line passing through said selected side portions and the bottom wall of the box, means for securing together adjacent side portions of the blank which have been placed in adjacent positions by said last mentioned folding operation to form the side walls of the box while said blank is traveling along said straight path.

7. In a collapsed box making machine, means to feed a blank through the machine along a substantially straight line in the direction of the length of the blank, means to fold over selected side portions one on each side about longitudinal lines lying in the direction of blank travel onto the body of the blank while the blank is traveling along said straight path, means to fold together the forward part of said blank and the rear part of said blank about a transverse line transverse to the direction of blank travel while the blank is traveling along said straight path, said transverse line passing through said selected side portions, means for securing together adjacent side portions of the blank which have been placed in adjacent positions by said last mentioned folding operation while said blank is traveling along said straight path.

8. In a machine for making collapsible bottom boxes, means to feed a blank through the machine along a substantially straight line, means for folding portions of the blank which are to form the bottom of the box while said blank is traveling along said straight line, means for feeding the blank in such folded form along said straight line, and means for securing other portions of the blank together as such blank is in such folded form and while said blank is traveling along said straight line, and means for delivering the collapsed blank from the machine.

In testimony whereof I have hereunto set my hand.

FRANK GUY PECK.